United States Patent [19]

Belart

[11] 4,137,718
[45] Feb. 6, 1979

[54] POWER BRAKE UNIT

[75] Inventor: Juan Belart, Walldorf, Hessen, Fed. Rep. of Germany

[73] Assignee: ITT Industries, Inc., New York, N.Y.

[21] Appl. No.: 783,122

[22] Filed: Mar. 31, 1977

[30] Foreign Application Priority Data

Apr. 10, 1976 [DE] Fed. Rep. of Germany ....... 2615805

[51] Int. Cl.$^2$ ............................................. B60T 13/20
[52] U.S. Cl. ........................................ 60/551; 60/553;
 60/562; 60/579; 60/594
[58] Field of Search ................. 60/547, 548, 550, 551,
 60/552, 553, 562, 579, 581, 588, 593, 594, 555;
 91/369, 391 R

[56] References Cited

U.S. PATENT DOCUMENTS

| 2,472,695 | 6/1949 | Chovings | 60/547 |
| 3,176,467 | 4/1965 | Van House | 60/547 |
| 3,712,057 | 1/1973 | Aiki | 60/547 |
| 3,815,364 | 6/1974 | Belart | 60/552 |
| 3,855,797 | 12/1974 | Papiau | 60/593 |
| 3,894,390 | 7/1975 | Belart | 60/552 |

FOREIGN PATENT DOCUMENTS 1910592  9/1970  Fed. Rep. of Germany ............ 60/579

Primary Examiner—Martin P. Schwadron
Assistant Examiner—Abraham Hershkovitz
Attorney, Agent, or Firm—John T. O'Halloran; Alfred C. Hill

[57] ABSTRACT

A housing includes therein a servo pressure control valve disposed in parallel to a master-cylinder piston. The foot pedal operates an actuating member which operates directly on the master-cylinder piston and via a forked section of the actuating member on the servo pressure control valve.

24 Claims, 2 Drawing Figures

POWER BRAKE UNIT

BACKGROUND OF THE INVENTION

This invention relates to a power brake unit for a hydraulic braking system including an auxiliary piston operable by servo pressure and a master cylinder whose piston is adapted to be acted upon in the operating direction hydraulically by pressure fluid displaced by the auxiliary piston and, in the event of failure of servo pressure, the master cylinder is mechanically displaced in the operating direction, with the diameter of the auxiliary piston being greater than the diameter of the piston of the master cylinder. Such a power brake unit is known from German Published Patent Application DT-OS No. 24 60 529 published July 3, 1975.

In this known power brake unit, the metered servo pressure acts in the operating direction on a diaphragm (or booster piston) which is supported on the auxiliary piston through an intermediate member, whereby the auxiliary piston is displaced in the operating direction when the brake is applied. Disposed between the auxiliary piston and the master-cylinder piston is a pressure chamber which is adapted to be closed by a valve arrangement. With the valve arrangement closed, movement of the auxiliary piston causes the pressure fluid in the pressure chamber to be displaced, thereby shifting the piston of the master cylinder by an amount which, proportionate to the diameter ratio between auxiliary piston and master-cylinder piston, is greater than the travel of displacement of the auxiliary piston. The valve arrangement is moved in an opening direction by the servo pressure so that it provides for communication between the pressure chamber and a reservoir when the servo pressure has failed. In this case, the diaphragm and thus the auxiliary piston are operated only by the driver's pedal force. However, because pressure is not able to build up between the auxiliary piston and the master-cylinder piston due to the valve arrangement being open to the reservoir, both pistons remain in mutual abutment and are displaced jointly by the same amount.

It is a principal disadvantage in this known power brake unit that such a valve arrangement must be provided for opening the pressure chamber when no servo pressure is available, in order to achieve different pedal-travel transmission ratios. It is another disadvantage in this method that the servo pressure, in the first place, is converted into a mechanical force in the booster portion by acting upon the diaphragm which in turn acts on the auxiliary piston. The forces are thus transmitted through a plurality of components. This is a particular disadvantage should the servo pressure fail, when the operator's pedal force, which is anyway rather low, is transmitted first to the diaphragm and then to the auxiliary piston through intermediate members before it eventually reaches the piston of the master cylinder. Due to the power losses occurring at each force-transmitting member, the efficiency of the power brake unit is adversely affected. Further, the operational safety is impaired due to the plurality of components inserted in the force path. Considering the known power brake unit as a whole, it is, in addition to having functional disadvantages, complicated and thus also expensive.

SUMMARY OF THE INVENTION

It is the object of the present invention to simplify a power brake unit of the type initially referred to and design it in such a manner that in the event of failure of servo pressure, the master-cylinder piston can be operated directly and that the necessity for a valve arrangement governed by the servo pressure and controlling the pressure chamber is avoided.

A feature of the present invention is the provision of a power brake unit for a hydraulic braking system comprising: an auxiliary piston operated by a servo pressure fluid; a master cylinder parallel to the auxiliary piston, the master cylinder having a master-cylinder piston adapted to be acted upon in an operating direction hydraulically by the pressure fluid supplied by the auxiliary piston and, in the event of failure of the servo pressure, mechanically, the auxiliary piston having a diameter greater than the master-cylinder piston diameter; an actuating member supported by the master-cylinder piston, the actuating member being acted upon in opposition to the operating direction by the pressure fluid; a valve arrangement disposed in the auxiliary piston to control the pressure fluid, the valve arrangement being coupled to the actuating member; and the auxiliary piston is moved in the operating direction directly by the pressure fluid.

It is achieved by this method that in the event of failure of the servo pressure the master-cylinder piston is directly displaced by the actuating member, and there are no intermediate elements which would reduce the efficiency of the force path. Because the auxiliary piston is not forcibly displaced by the actuating member, there is no pressure fluid displaced by this member which would have to be discharged, unpressurized, into the reservoir through a valve arrangement. Owing to the fact that the servo pressure acts directly on the auxiliary piston which obviates the need for the diaphragm or the booster piston, a substantial simplification of the power brake unit is achieved. By arranging the servo-pressure-controlling valve arrangement in the auxiliary piston, it is ensured that the actuating member travels always an amount corresponding to the displacement travel of the auxiliary piston, which is of importance to the brake feel conveyed to the vehicle operator.

In a particularly advantageous embodiment, the housing includes a bore which is disposed paraxially to the master cylinder, accommodates the auxiliary piston slidably sealed therein and is open towards a booster chamber adjacent the foot pedal actuating member. The end of the auxiliary piston remote from the booster chamber defines in the bore a pressure chamber communicating with a work chamber of the master cylinder, with the work chamber being defined by the master-cylinder piston end closest to the booster chamber and being shut off from the booster chamber by means of a partition. The actuating member is in a coaxial relationship with the master cylinder and extends in a slidably sealed relation into the booster chamber through the housing wall and into the work chamber through the partition and is adapted to be supported on the master-cylinder piston. A lateral extension of the actuating member is disposed in the booster chamber and is adapted to influence the valve arrangement in the auxiliary piston which is adapted to connect the booster chamber with a pressure-fluid source or an unpressurized reservoir. The advantage of this embodiment is that it is particularly compact and very short. Further, there is no need for the actuating member to extend slidably through the auxiliary piston which is otherwise a requirement if auxiliary piston and master cylinder are coxially arranged.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
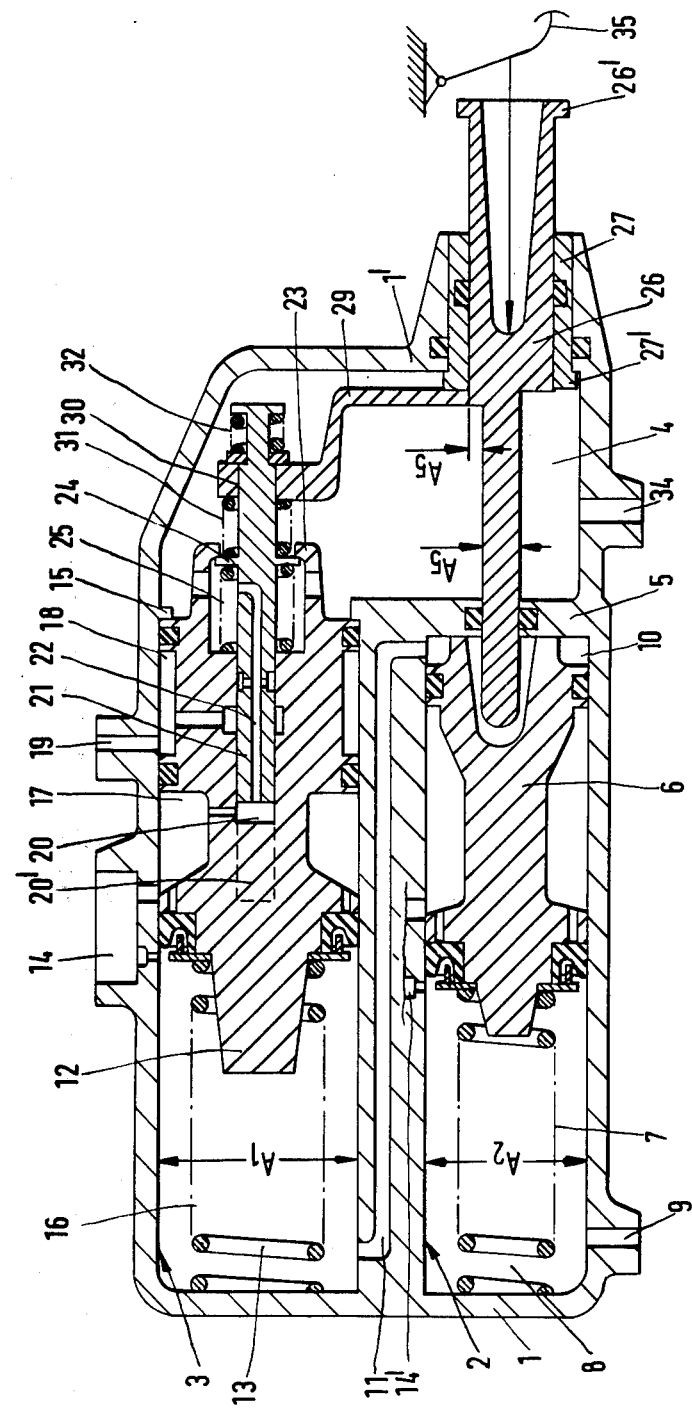
FIG. 1 is a longitudinal cross sectional view of a first embodiment of the power brake unit in accordance with the principles of the present invention.

In FIG. 1, a housing 1 accommodates a master cylinder 2 and a bore 3 disposed paraxially thereto. A booster chamber 4 is formed behind master cylinder 2 and bore 3. Master cylinder 2 is separated from booster chamber 4 by a partition 5. The rear end of bore 3 is open towards booster chamber 4. The diameter $A_1$ of bore 3 is greater than the diameter $A_2$ of master cylinder 2.

Master cylinder 2 accommodates slidably sealed therein a piston 6 which is acted upon by a return spring 7 to the rear, i.e., in opposition to the operating direction. In front of the piston, there is thus defined a master-cylinder chamber 8 which is adapted to be connected to a first brake circuit through a port 9. In a known manner, master-cylinder chamber 8 is in communication with a reservoir 14' through a breather bore as long as piston 6 is in its rearmost end position. Behind piston 6, there is defined in master cylinder 2 a work chamber 10 which connects with the front end of bore 3 through a channel 11.

Bore 3 accommodates slidably sealed therein an auxiliary piston 12 defining in the front area of bore 3 a pressure chamber 13. Similar to master cylinder 2, pressure chamber 13 is in communication with a reservoir 14 through a breather bore as long as the master-cylinder unit is in its rearmost end position. This rearmost end position is defined by a stop 15 of housing 1 against which auxiliary piston 12 is urged by a return spring 16.

Auxiliary piston 12 has an annular groove 17 permanently communicating with reservoir 14 and an annular groove 18 which is in permanent communication with a port 19 adapted to connect with a pressure-fluid source not shown. Annular grooves 17 and 18 are sealed relative to each other and to pressure chamber 13 and booster chamber 4 at bore 3. Further, auxiliary piston 12 has a coaxial valve bore 20 which is open towards booster chamber 4 and accommodates a valve spool 21 extending into booster chamber 4. An orifice connected with annular groove 17 opens into the front area of valve bore 20, and another orifice connected with annular groove 18 opens into the rear area. Internal to valve spool 21 is a channel 22 which is in permanent communication with booster chamber 4. In a known manner, valve spool 21 is designed such that, when viewed relative to auxiliary piston 12, it connects in the retracted position booster chamber 4 with the orifice connected with annular groove 17, keeping at the same time the orifice connecting with annular groove 18 closed. When moving to the front of the unit, valve spool 21 will first close the orifice connected with annular groove 17 and then open the orifice connected with annular groove 18, thereby providing for communication of the latter with booster chamber 4. Auxiliary piston 12 has a stop 23 upon which valve spool 21 may be supported with a projection 24 opposite the direction of operation and which defines the rearmost end position of valve spool 21. A return spring 25 biasses valve spool 21 into that end position.

Coaxially to master cylinder 2, an actuating member 26 extends into booster chamber 4 and further through partition 5 into work chamber 10. In addition, there is provided in housing wall 1' a coaxial, slidable sealed sleeve 27 through which actuating member 26 extends, likewise slidably sealed, from the outside of housing 1 into booster chamber 4. In booster chamber 4, sleeve 27 has a shoulder 27' which prevents it from sliding out of housing 1. Outside housing 1, actuating member 26 has a stop 26' by means of which it is able to be supported upon sleeve 27 in the operating direction after having overcome a predetermined actuating travel, and which provides for displacement of sleeve 27 by and together with the actuating member as the travel continues. Actuating member 26 has in booster chamber 4 a lateral extension 29 with an opening 30 surrounding valve spool 21. A spring 31 likewise surrounds valve spool 21, taking support on projection 24 and on lateral extension 29. Disposed behind lateral extension 29 is a centering spring 32 surrounding the valve spool and being supported on valve spool 21 opposite the operating direction. In the direction of operation, centering spring 32 is likewise supported by valve spool 21 and/or lateral extension 29 through a washer. It is to be noted in this method that spring 31 is stronger than return spring 25, but weaker than centering spring 32.

Provided at booster chamber 4 is a port 34 permitting direct connection of a second brake circuit to booster chamber 4. As indicated schematically, actuating member 26 is connected to a brake pedal 35 outside housing 1 so that depression of brake pedal 35 causes displacement of actuating member 26 in the direction of operation. From this ensues the following mode of operation with respect to the embodiment of FIG. 1.

If the vehicle operator depresses brake pedal 35 and the fluid pressure source is intact and servo pressure is thus available, actuating member 26 will be displaced into the operating direction. Due to the action of spring 31, valve spool 21 will be displaced in the same manner by lateral extension 29, in opposition to the weaker return spring 25. The orifice towards annular groove 17 is thereby closed while the orifice towards annular groove 18 is subsequently released, causing flow of pressure fluid from the pressure-fluid source into booster chamber 4. The pressure building up in booster chamber 4 is supplied to the second brake circuit through port 34 and acts upon the end of auxiliary piston 12 closest to booster chamber 4. Auxiliary piston 12 is thereby likewise displaced in the operating direction until it has reached a state of equilibrium as a result of pressure built up in pressure chamber 13. However, since pressure chamber 13 connects with work chamber 10, the pressure prevailing therein will correspond to the pressure in booster chamber 4, thereby causing displacement of piston 6 of master cylinder 2 and building up of a brake pressure in master-cylinder chamber 8 which is fed to the first brake circuit through port 9. In this process, the travel of displacement of auxiliary piston 12 corresponds to the travel of actuation of actuating member 26 because valve spool 21 always provides for controlled delivery of such an amount of pressure fluid into booster chamber 4 as is necessary to displace the auxiliary piston in accordance with valve spool 21. The deviation caused by the control travel of the valve spool may be neglected. However, proportionate to the diameter ratio between bore 3 and master cylinder 2, piston 6 has a greater displacement travel than auxiliary piston 12 and actuating member 26. As a result, piston 6 moves away from actuating member 26 and is displaced purely by hydraulic means. Nevertheless, the actuating travel of actuating member 26 is dependent on the fluid volume drawn by the first brake circuit. With the pressure-fluid source intact, the actuating travel is merely smaller than when the piston is displaced by actuating member 26 directly.

A reaction force which the vehicle operator feels and which is proportional to the generated braking pressure results from the action of pressure fluid on actuating member 26 in booster chamber 4 and in work chamber 10. If actuating member 26 extends through housing wall 1' and partition 5 with the same diameter, actuating member 26 is acted upon effectively only in work chamber 10.

By virtue of sleeve 27 whose cross-sectional area is likewise acted upon by the pressure in booster chamber 4 opposite the operating direction, the reaction force is increased as in a surge as soon as stop 26' rests against sleeve 27, in order to prevent overloading of the brake unit.

If the pressure-fluid source fails, it is not possible to build up pressure in booster chamber 4 and thus in pressure chamber 13 and work chamber 10. As a result, the piston of the master cylinder is not hydraulically actuated but comes to rest directly against actuating member 26 by which it is then directly and mechanically displaced. In this process, there exists no substantial force acting upon auxiliary piston 12, and only after the control piston has reached its foremost end position will it be displaced, through spring 31, to such an extent as pressure fluid can be urged out of pressure chamber 13 into work chamber 10.

The displacement travel of auxiliary piston 12 which is shorter in relation to actuating member 26 is absorbed by spring 31. This spring 31 could also be omitted and a rigid connection be provided between lateral extension 29 and valve spool 21 if, as indicated by dash line 20', valve bore 20 is suitably deep so that the valve spool can be moved in the auxiliary piston by an amount substantially beyond its control travel. It would also be achieved by this method that no substantial force is transmitted from lateral extension 29 to auxiliary piston 12.

The purpose of centering spring 32 is to avoid the transfer to high, jerky forces from valve spool 21 to lateral extension 29 when brake pedal 35 is suddenly released and servo pressure is available. In such a case, actuating member 26 jumps back as a result of the pressure fluid acting thereupon in booster chamber 4 and in work chamber 10, and valve spool 21 would be violently forced against stop 23. At high pressures this may subject these components to substantial mechanical stress which is avoided by the provision of centering spring 32.

Figure 2:
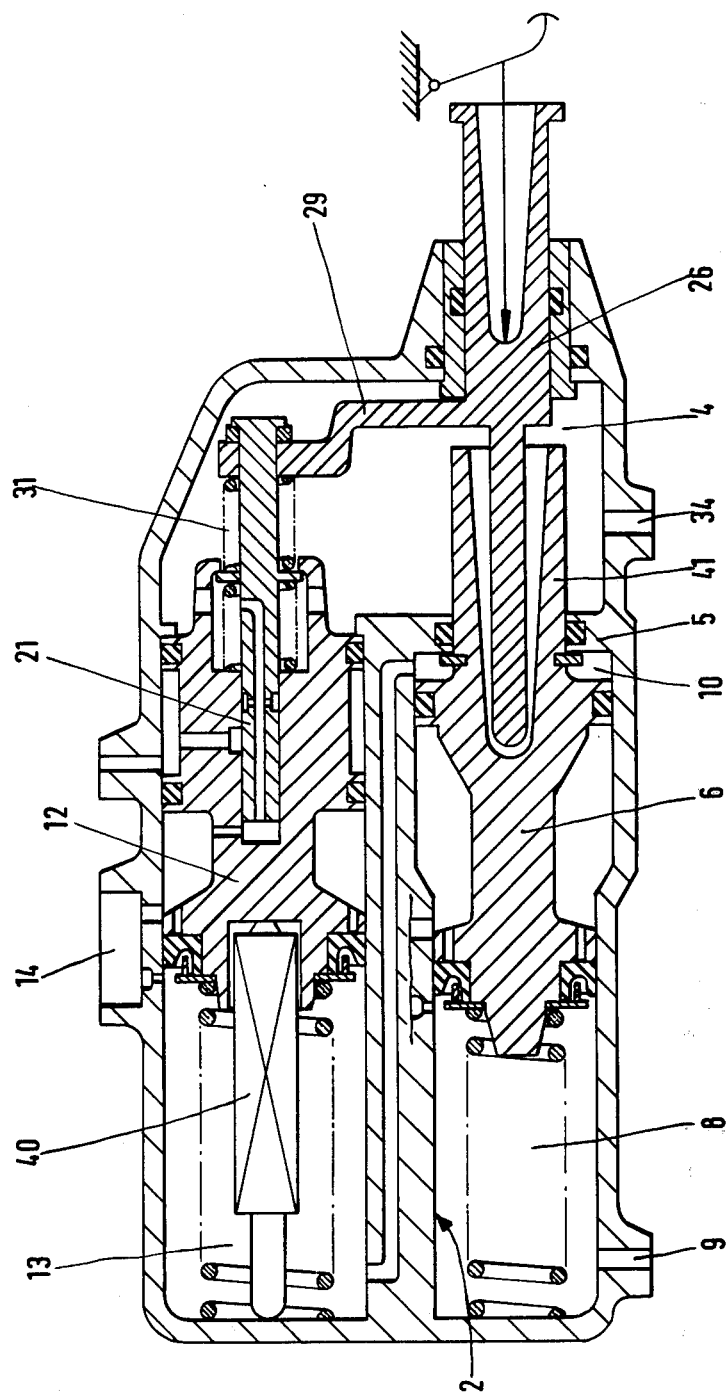
FIG. 2 is a longitudinal cross sectional view of a second embodiment of the power brake unit in accordance with the principles of the present invention.

The embodiment of FIG. 2 is essentially the same as the embodiment of FIG. 1 so that identical parts need not be explained again in the following. The essential structural differences between FIG. 2 and FIG. 1 are the following.

Pressure chamber 13 accommodates a travel simulator 40 supporting itself between housing 1 and auxiliary piston 12. This travel simulator 40 comprises essentially a simulator spring and the associated guiding elements. Travel simulator 40 causes a force to act on auxiliary piston 12 in opposition to the operating direction, with the force increasing as the displacement travel of auxiliary piston 12 increases.

Master cylinder 2 and its piston 6 are of stepped design, with the larger diameter adjacent booster chamber 4. Piston 6 has on its end adjacent booster chamber 4 a coaxial extension 41 which extends slidably sealed through partition 5 into booster chamber 4. Actuating member 26 is supported in a recess of this extension 41. This prevents member 26 from moving into work chamber 10, which is of annular shape because of extension 41, and member 26 is acted upon opposite the operating direction only by the pressure in booster chamber 4.

Spring 31 is longer than the spring in the embodiment of FIG. 1 to enable lateral extension 29 to move relative to valve spool 21 by a larger amount in the event of failure of the pressure-fluid source, because in the embodiment of FIG. 2 auxiliary piston 12 is in this case kept in its rest position by the travel simulator.

There results the following mode of operation.

When actuating member 26 is displaced, valve spool 21 provides again for metered delivery of pressure fluid into booster chamber 4, the fluid acting upon and displacing auxiliary piston 12 in the operating direction and being able to be fed to the second brake circuit again through port 34 and acting upon actuating member 26 opposite the operating direction. Due to the pressure in booster chamber 4, piston 6 of master cylinder 2 is also acted upon in the direction of operation at its extension 41. Part of the force acting on the auxiliary piston in the operating direction is supported through travel simulator 40. The remaining force causes a pressure increase in pressure chamber 13. This pressure acts upon piston 6 of master cylinder 2 in work chamber 10 in the operating direction. The master-cylinder piston 6 is thereby actuated hydraulically to provide a pressure build up in master-cylinder chamber 8 which is fed to the first brake circuit through port 9.

By suitably dimensioning the actuated ends of piston 6 of master cylinder 2 and, if necessary, also of auxiliary piston 12, it is achieved that the pressure in master-cylinder chamber 8 corresponds to the pressure metered to booster chamber 4, i.e., both brake circuits receive the same amount of pressure. However, this method makes it also possible to achieve a specific pressure ratio to make allowance for a necessary brake balancing.

By biasing travel simulator 40 it is also achieved that booster chamber 4 is pressurized to a predetermined degree before auxiliary piston 12 is displaced. This pressure displaces piston 6 by acting upon extension 41, thereby overcoming the brake clearance. The volume increase of work chamber 10 is compensated for by pressure fluid supplied by reservoir 14 through the breather opening and pressure chamber 13. Only after a predetermined pressure level has been reached does auxiliary piston 12 move, thereby closing the breather opening. Consequently, the pedal travel is always the same, independent of the clearance of the brakes connected to the first brake circuit, and depends only on the elasticity of the brake system.

Should the pressure-fluid source fail, auxiliary piston 12 will remain in its end position due to travel simulator 40. Similar to the embodiment of FIG. 1, piston 6 of master cylinder 2 will be displaced directly mechanically by actuating member 26. In this process, lateral extension 29 on valve spool 21 will also be displaced when the latter has reached its foremost end position. This displacement travel is absorbed by spring 31. As is the case in the overcoming of the clearance, the volume increase in work chamber 10 is compensated for by pressure fluid supplied from reservoir 14.

In the event of failure of the first brake circuit which is connected to master-cylinder chamber 8, and with the pressure-fluid source intact, piston 6 of master cylinder 2 first encounters no counterforce in master-cylinder chamber 8. It is therefore displaced into its foremost end position by the low pressure building up in booster chamber 4 prior to displacement of auxiliary piston 12, and an appropriate amount of pressure fluid is drawn from reservoir 14 into work chamber 10 via pressure chamber 13. As soon as the pressure in booster chamber 4 reaches a value causing displacement of auxiliary piston 12 against travel simulator 40, the port opening into reservoir 14 will be closed and, because in that case pressure fluid can no longer be urged out of pressure chamber 13 since work chamber 10 is no longer in a position to take up more pressure fluid, auxiliary piston 12 will be hydraulically locked. This permits, without loss of travel, a normal braking pressure to be built up in booster chamber 4 which is supplied to the second brake circuit. Consequently, there is no dead travel at brake pedal 35 to move piston 6 of master cylinder 2 into its end position.

It is to be understood that the second brake circuit need not necessarily be connected to booster chamber 4 to achieve the advantages afforded by this invention. The master cylinder 2 could just as well be designed as a conventional tandem master cylinder.

While I have described above the principles of my invention in connection with specific apparatus it is to be clearly understood that this description is made only by way of example and not as a limitation to the scope of my invention as set forth in the objects thereof and in the accompanying claims.

I claim:

1. A power brake unit for a hydraulic braking system comprising:
   a housing;
   an auxiliary piston disposed in said housing operated on one side thereof by a servo pressure fluid for pressurizing a body of hydraulic fluid on the other side of said auxiliary piston;
   a master cylinder disposed in said housing parallel to said auxiliary piston, said master cylinder having a master-cylinder piston being moved in an operating direction under the action of said body of hydraulic fluid pressurized by said auxiliary piston and, in the event of failure of said servo pressure, mechanically;
   an actuating member extending through said housing and having an abutment connection with said master-cylinder piston, said actuating member being acted upon in operation to said operating direction by said pressurized body of hydraulic fluid; and
   a valve arrangement disposed in said auxiliary piston to control said servo pressure fluid;
   said auxiliary piston being moved in said operating direction directly by said servo pressure fluid; and
   said actuating member having a lateral extension disposed in said housing connected to said valve arrangement for control thereof.

2. A power brake unit for a hydraulic braking system comprising;
   an auxiliary piston operated on one side thereof by a servo pressure fluid for pressurizing a body of hydraulic fluid on the other side of said auxiliary piston;
   a master cylinder parallel to said auxiliary piston, said master cylinder having a master-cylinder piston being moved in an operating direction under the action of said body of hydraulic fluid pressurized by said auxiliary piston and, in the event of failure of said servo pressure, mechanically;
   an actuating member having an abutment connection with said master-cylinder piston, said actuating member being acted upon in opposition to said operating direction by said pressurized body of hydraulic fluid;
   a valve arrangement disposed in said auxiliary piston to control said servo pressure fluid, said valve arrangement being coupled to said actuating member;
   said auxiliary piston is moved in said operating direction directly by said servo pressure fluid;
   a housing including a bore parallel to said master cylinder accommodating therein said auxiliary piston in a slidably sealed relation to said bore;
   a booster chamber in said housing adjacent said actuating member; a work chamber disposed in said master cylinder; and
   a pressure chamber disposed adjacent the end of said auxiliary piston remote from said booster chamber in communication with said work chamber;
   said work chamber being defined by said master-cylinder piston end adjacent said booster chamber and a partition in a transverse relationship with said bore defining said booster chamber in conjunction with said housing; and
wherein
   said actuating member is in a coaxial relationship with said master cylinder, extends through said housing into said booster chamber, and extends through said partition; and
   said actuating member includes a lateral extension in said booster chamber connected to said valve arrangement to control said valve arrangement to connect said booster chamber with a selected one of an input for said servo pressure fluid and a connection to a unpressurized reservoir.

3. A power brake unit according to claim 2, wherein said valve arrangement includes
   a valve bore disposed axially of said auxiliary piston,
   a valve spool slidable in said valve bore,
   a channel disposed in said valve spool opening into said booster chamber, said channel providing communication between said booster chamber and said reservoir in the rest position of said valve spool, said channel closing said communication between said booster chamber and said reservoir and coupling said pressure fluid to said booster chamber upon displacement of said valve spool relative to said auxiliary piston in said operating direction; and
   said lateral extension displaces said valve spool in said operating direction.

4. A power brake unit according to claim 3, wherein an end of said valve spool projects into said booster chamber and extends through an opening in said lateral extension,
further including a first spring disposed to encircle said valve spool and supported between a projection on said valve spool and said lateral extension;

a second spring disposed to encircle said valve spool and supported between said lateral extension and a step on said valve spool in said booster chamber; and a third spring disposed to encircle said valve spool and supported between said auxiliary piston and said projection on said valve spool to bias said valve spool against a stop on said auxiliary piston;

said first spring being stronger than said third spring, but weaker than said second spring.

5. A power brake unit according to claim 4, further including a sleeve slidably sealed to an end wall of said housing adjacent said booster chamber and coaxial of said master cylinder;

said actuating member extending in a slidably sealed relationship through said sleeve into said booster chamber;

a shoulder disposed on said sleeve in said booster chamber to prevent said sleeve from sliding out of said housing; and said actuating member has disposed thereon external of said housing a stop adapted to rest against said sleeve.

6. A power brake unit according to claim 5, further including a first pressure-fluid port disposed in said master cylinder remote from said booster chamber for a first brake circuit; and a second pressure-fluid port disposed in said booster chamber for a second brake circuit.

7. A power brake unit according to claim 6, further including a travel simulator disposed in said pressure chamber supported between an end wall of said housing remote from said booster chamber and said auxiliary piston.

8. A power brake unit according to claim 7, wherein said master cylinder and said master-cylinder piston are of stepped design with the larger diameter thereof being adjacent said booster chamber.

9. A power brake unit according to claim 8, further including a coaxial extension for said master-cylinder piston extending in a slidably sealed relation through said partition into said booster chamber, said coaxial extension supporting said actuating member.

10. A power brake unit according to claim 1, wherein a booster chamber is defined in said housing adjacent said actuating member and said valve arrangement includes a valve bore disposed axially of said auxiliary piston, a valve spool slidable in said valve bore, a channel disposed in said valve spool opening into said booster chamber, said channel providing communication between said booster chamber and a reservoir in the rest position of said valve spool, said channel closing said communication between said booster chamber and said reservoir and coupling said servo pressure fluid to said booster chamber upon displacement of said valve spool relative to said auxiliary piston in said operating direction; and said actuating member displaces said valve spool in said operating direction.

11. A power brake unit according to claim 10, further including a sleeve slidably sealed to an end wall of said housing adjacent said booster chamber and coaxial of said master cylinder;

said actuating member extending in a slidably seald relationship through said sleeve into said booster chamber;

a shoulder disposed on said sleeve in said booster chamber to prevent said sleeve from sliding out of said housing; and said actuating member has disposed thereon external of said housing a stop adapted to rest against said sleeve.

12. A power brake unit according to claim 11, further including a first pressure-fluid port disposed in said master cylinder remote from said booster chamber for a first brake circuit; and a second pressure-fluid port disposed in said booster chamber for a second brake circuit.

13. A power brake unit according to claim 12, further including a pressure chamber defined in said housing on said other side of said auxiliary piston and a travel simulator disposed in said pressure chamber supported between an end wall of said housing remote from said booster chamber and said auxiliary piston.

14. A power brake unit according to claim 13, wherein said master cylinder and said master-cylinder piston are of stepped design with the larger diameter thereof being adjacent said booster chamber.

15. A power brake unit according to claim 1, further including a booster chamber defined in said housing adjacent said actuating member and a sleeve slidably sealed to an end wall of said housing adjacent said booster chamber and coaxial of said master cylinder;

said actuating member extending in a slidably sealed relationship through said sleeve into said booster chamber;

a shoulder disposed on said sleeve in said booster chamber to prevent said sleeve from sliding out of said housing; and said actuating member has disposed thereon external of said housing a stop adapted to rest against said sleeve.

16. A power brake unit according to claim 15, further including a first pressure-fluid port disposed in said master cylinder remote from said booster chamber for a first brake circuit; and a second pressure-fluid port disposed in said booster chamber for a second brake circuit.

17. A power brake unit according to claim 16, further including a pressure chamber defined in said housing on said other side of said auxiliary piston and a travel simulator disposed in said pressure chamber supported between an end wall of said housing remote from said booster chamber and said auxiliary piston.

18. A power brake unit according to claim 17, wherein said master cylinder and said master-cylinder piston are of stepped design with the larger diameter thereof being adjacent said booster chamber.

19. A power brake unit according to claim 1, further including
   a booster chamber defined in said housing adjacent said actuating member and a first pressure-fluid port disposed in said master cylinder remote from said booster chamber for a first brake circuit; and
   a second pressure-fluid port disposed in said booster chamber for a second brake circuit.

20. A power brake unit according to claim 19, further including
   a pressure chamber defined in said housing on said other side of said auxiliary piston and a travel simulator disposed in said pressure chamber supported between an end wall of said housing remote from said booster chamber and said auxiliary piston.

21. A power brake unit according to claim 20, wherein said master cylinder and said master-cylinder piston are of stepped design with the larger diameter thereof being adjacent said booster chamber.

22. A power brake unit according to claim 1, further including
   a pressure chamber defined in said housing on said other side of said auxiliary piston, a booster chamber defined in said housing adjacent said actuating member and a travel simulator disposed in said pressure chamber supported between an end wall of said housing remote from said booster chamber and said auxiliary piston.

23. A power brake unit according to claim 22, wherein
   said master cylinder and said master-cylinder piston are of stepped design with the larger diameter thereof being adjacent said booster chamber.

24. A power brake unit according to claim 1, wherein said master cylinder and said master-cylinder piston are of stepped design with the larger diameter thereof being adjacent said booster chamber.

* * * * *